United States Patent [19]

Moreira et al.

[11] Patent Number: 5,812,082
[45] Date of Patent: Sep. 22, 1998

[54] METHOD FOR AZIMUTH SCALING OF SAR DATA AND HIGHLY ACCURATE PROCESSOR FOR TWO-DIMENSIONAL PROCESSING OF SCANSAR DATA

[75] Inventors: Alberto Moreira, Garching; Josef Mittermayer, München, both of Germany

[73] Assignee: Deutsche Forschungsanstalt fur Luft-und Raumfahrt e.V., Köln, Germany

[21] Appl. No.: 816,044

[22] Filed: Mar. 11, 1997

[30] Foreign Application Priority Data

Mar. 13, 1996 [DE] Germany ............ 196 09 728.2

[51] Int. Cl.[6] .................................................. G01S 13/90
[52] U.S. Cl. ...................... 342/25; 342/162; 342/191; 342/192; 342/196
[58] Field of Search ................ 342/25, 89, 162, 342/191, 192, 193, 194, 195, 196

[56] References Cited

U.S. PATENT DOCUMENTS

| | | | |
|---|---|---|---|
| 4,292,634 | 9/1981 | Frosch et al. ........................... | 342/25 |
| 4,471,357 | 9/1984 | Wu et al. ................................ | 342/25 |
| 4,999,635 | 3/1991 | Niho ....................................... | 342/25 |
| 5,200,754 | 4/1993 | Niho ....................................... | 342/25 |
| 5,343,204 | 8/1994 | Farmer et al. ......................... | 342/25 |
| 5,424,742 | 6/1995 | Long et al. ............................. | 342/25 |
| 5,430,445 | 7/1995 | Peregrim et al. ...................... | 342/25 |
| 5,469,167 | 11/1995 | Polge et al. ............................ | 342/25 |
| 5,627,543 | 5/1997 | Moreira .................................. | 342/25 |
| 5,659,318 | 8/1997 | Madsen et al. ........................ | 342/25 |
| 5,667,373 | 9/1997 | Wright et al. .......................... | 342/81 |
| 5,675,550 | 10/1997 | Ekhaus ................................... | 367/7 |

OTHER PUBLICATIONS

Moreira et al., "Airborne SAR Processing of Highly Squinted Data Using a Chirp Scaling Approach with Integrated Motion Compensation", IEEE Transactions on Geoscience and Remote Sensing, vol. 32, No. 5, pp. 1029–1040, Sep. 1994.

Raney et al., "Precision SAR Processing Using Chirp Scaling", IEEE Transactions on Geoscience an Remote Sensing, vol. 32, No. 4, pp. 786–799, Jul. 1994.

Sack et al., "Application of Efficient Linear FM Matched Filtering Algorithms to Synthetic Aperture Radar Processing", IEEE Proceedings, vol. 132, pt. F, No. 1, p. 57, Feb. 1985.

*Primary Examiner*—John B. Sotomayor
*Attorney, Agent, or Firm*—Browdy and Neimark

[57] ABSTRACT

In a method for azimuth scaling of SAR data without interpolation, raw SAR data in azimuth are multiplied with a phase function $H_5(f_a;r_o)$, where $f_a$ denotes the azimuth frequency and $r_o$ denotes the range to a target point, and where a desired scaling factor is entered into the phase function. An azimuth modulation of the SAR data is subsequently adapted with the phase function $H_5(f_a,r_o)$ to that of a reference range, in a manner so that the azimuth modulation no longer depends on the range. In a last step of the process, a quadratic phase modulation is performed in the azimuth so that, in order to attain an azimuth processing with a very high phase accuracy, the azimuth frequency modulation becomes exactly linear.

2 Claims, 7 Drawing Sheets

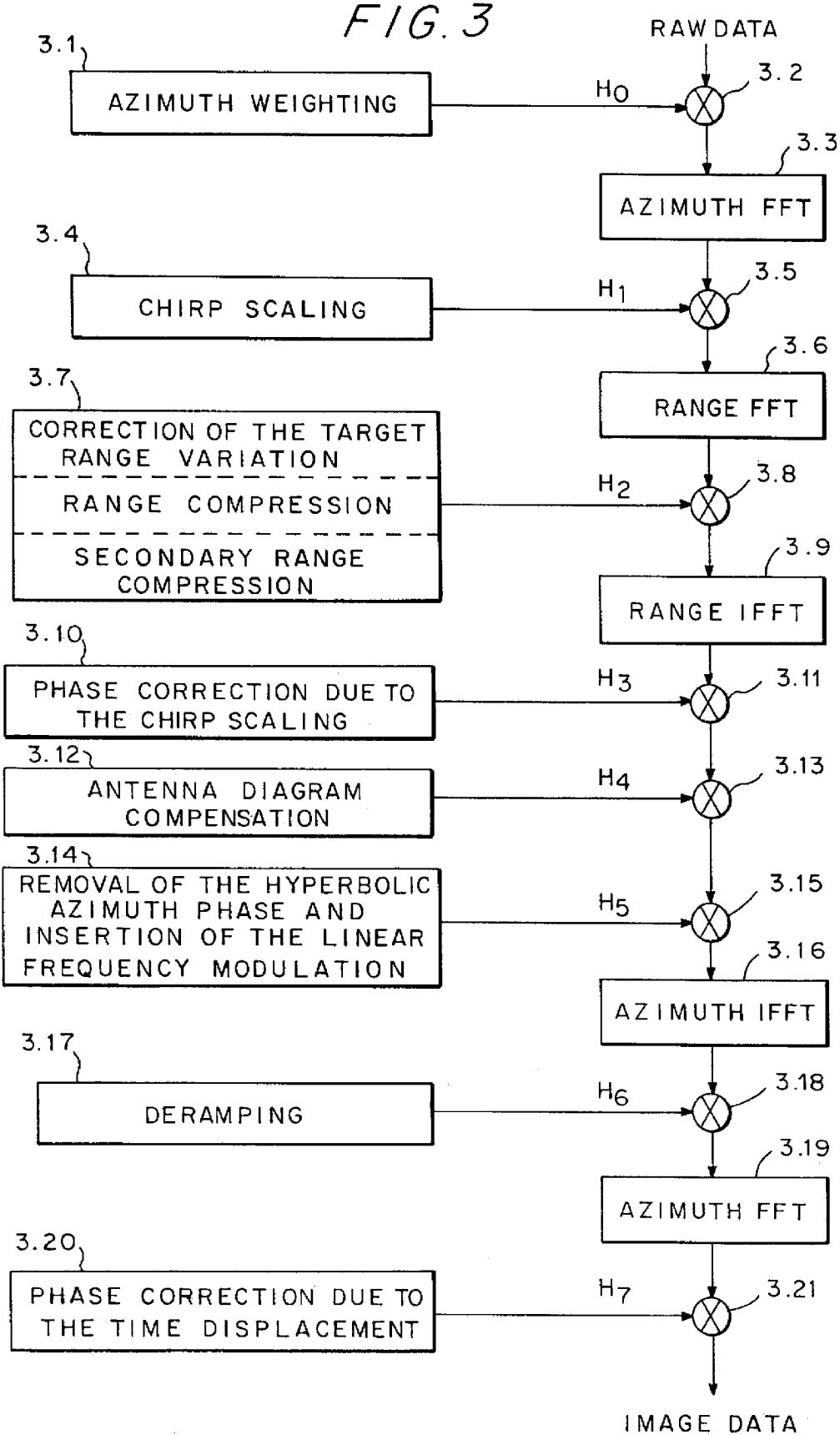

METHOD FOR AZIMUTH SCALING OF SAR DATA AND HIGHLY ACCURATE PROCESSOR FOR TWO-DIMENSIONAL PROCESSING OF SCANSAR DATA

FIELD OF THE INVENTION

The invention pertains to a method for the azimuth scaling of SAR data and a highly accurate processor for two-dimensional processing of ScanSAR data.

REVIEW OF RELATED TECHNOLOGY

First, SAR and ScanSAR systems will be briefly described.

Synthetic Aperture Radar (SAR) is used for remote sensing and is increasingly employed for imaging, surveillance and exploration of the Earth's surface. This type of system uses a vehicle, such as an aircraft, helicopter, etc., traveling at a constant speed; an antenna looking in a direction orthogonal to the direction of travel; and a coherent radar system that periodically transmits electromagnetic pulses. The vehicle's direction of travel is termed the azimuth direction and the direction orthogonal thereto and slanted downward is termed range direction.

In the course of a flight over an area to be observed, a swath, the length of the scanned stretch is imaged. The width of the swath depends, among other things, on the size of the time window in which the deflected radar echoes are received from a transmitted pulse. The received echoes are then frequency-converted (mixed), quadrature demodulated, digitized, and written into an echo recorder.

Each SAR processing essentially consists of a range compression, a correction of the target range variation and an azimuth compression:

In the case of the range compression, the geometric resolution in range direction depends on the bandwidth of the transmitted radar pulses. To improve this resolution, the transmitted pulses are modulated. For the chirp scaling method, the frequency modulation must be linear. The range compression represents a filtration of the received signals in the range direction according to the matched filter theory, resulting in the compression of the protracted signals into pulses.

In the case of the correction of a target range variation, this variation is a result of the changing range between the antenna and a point target during the formation of the synthetic aperture. It denotes the range variation of the echoes belonging to one point target in a two-dimensional echo recorder.

In the case of the azimuth correction, the pulse compression according to the matched filter theory results in the formation of the synthetic aperture in the azimuth. The azimuth modulation is an additional result of the varying range between the antenna and the target in the course of a vehicle flyby. The matched filtration represents a coherent summation of all echoes belonging to one azimuth position. If the target range variation is corrected prior to the azimuth compression, the latter may be performed with a one-dimensional filter function.

A ScanSAR mode is a mode of operation of a satellite-based SAR system with which swaths of considerably larger widths can be processed. The imaging geometry of a SAR system is shown in FIG. 1. In the ScanSAR mode, the available synthetic aperture is divided into several sub-apertures. During each sub-aperture, the antenna has a different look angle. As a result, several parallel partial swaths are imaged, thus resulting in a considerably larger overall swath width. The division of the synthetic aperture does, however, result in a deterioration of the attainable resolution in the azimuth. In FIG. 1, the total synthetic aperture is marked with $T_{ia}$, and the $n^{th}$ sub-aperture with $T_{sn}$.

To ensure a gap-free imaging of the partial swath in azimuth direction, a return to the $n^{th}$ sub-aperture must take place no later than after the time $T_{ia}-T_{sn}$. For ScanSAR processing, both the two-dimensional antenna diagram and the Doppler centroid must be accurately determined.

In FIG. 2, raw ScanSAR data are presented as a segment of raw SAR data. This raw SAR data consists of a continuous string of aligned echoes in azimuth direction. Raw ScanSAR data, in contrast, are blocks of aligned echoes. In the case of the raw SAR data, each point target has a complete azimuth chirp in azimuth direction and the full Doppler bandwidth. In the case of the raw ScanSAR data, on the other hand, each point target only has a partial chirp of the duration $T_s$. The partial chirps from targets in different azimuth positions represent different segments of a complete azimuth chirp, and are located above each other in the raw ScanSAR data block.

For ScanSAR processing, either a SPECAN method, a method in the frequency-domain, or an adapted swath mode method may be used. The SPECAN method (see publication by Sack M: Application of efficient linear FM matched filtering algorithms to synthetic aperture radar processing, IEEE Proceedings, Vol. 132, Pt. F, No. 1, February 1985) is a normal Range-Doppler method in which both the range compression and the correction of the target range variation are performed in the Range-Doppler domain. However, only the linear portion of the target range variation is corrected, and no secondary range compression is performed. The azimuth compression is performed through elimination of the Doppler modulation in the time-domain with a deramping function, and subsequent transformation to the Range-Doppler domain. The applied deramping function is a linear frequency-modulated signal with a range-dependent Doppler rate.

The method in the frequency-domain (see publication by Wilson C. and Corr D. G.: Data Processing Techniques and Operational Considerations for ScanSAR Systems, Proc. of IGARSS, 1991) is an unmodified Range-Doppler method. However, to prevent aliasing, the azimuth dimension of the ScanSAR data block must be expanded prior to the azimuth compression. An added range filled with zeros must have at least the azimuth length of the longest reference function in the azimuth. After such an expansion of the azimuth dimension, any method that is suitable for SAR processing, may also be used for ScanSAR processing.

The adapted swath mode method (see publication by Bamler R.: Adapting Precision Standard SAR Processors to ScanSAR, Proceeding of IGARSS '95, pages 2051 to 2053) is an expansion of the last-described method. A random number of raw ScanSAR data blocks are aligned and processed with any random SAR processing method. The resulting periodic modulation of the individual pulse responses is removed at the end of the processing with a low-pass filtration.

The (range) chirp scaling (see Raney R. K., Runge H., Bamler R., Cumming I. and Wong. F: Precision SAR Processing Using Chirp Scaling, IEEE Transactions on Geoscience and Remote Sensing, Vol. 32, July 1994. Moreira A., Huang Y.: Airborne SAR Processing of Highly Squinted Data Using a Chirp Scaling Approach with Integrated Motion Compensation, IEEE Transactions on Geoscience and Remote Sensing, Vol. 32, September 1994) takes place in the Range-Doppler domain. In the process, the trajectories on which the phase centers of the range chirps are located are adapted to the shape of a reference trajectory. With the chirp scaling process, the correction of the target range variation and the range compression are performed after the chirp scaling in the two-dimensional frequency-domain. Because of the performed adaptation of the trajectories, the same phase function, depending only on the Doppler frequency, may be used to correct the target range variation for all ranges. The azimuth compression is then again performed in the Range-Doppler domain. In the past, the chirp scaling method has only been used for processing of SAR data in the swath mode.

The disadvantage of the SPECAN method is that no accurate correction of the target range variation is performed, since only the linear portion of the target range variation is taken into account. Furthermore, the last Fast Fourier Transform (FFT) ends in the Range-Doppler domain. Getting to the scaling of the azimuth time-domain requires a complex resampling in azimuth direction.

Since the azimuth modulation represents only an approximation of a linear frequency modulation, the deramping function is only well-matched in the vicinity of the Doppler centroid. The farther the signal frequencies diverge from the Doppler centroid, the more this adaptation deteriorates, and thus the focusing in the azimuth.

The disadvantage of the method in the frequency-domain is the fact that, because of the expansion of the azimuth dimension, the same number of computations is required for a ScanSAR data block as for a normal raw SAR data block, thus resulting in a very large number of computations.

The disadvantage of the adapted swath mode method is the fact that, although the aligning of several raw ScanSAR data blocks does reduce the necessary computations, areas with zeroes remain between the individual raw data blocks. This means that the amount of required computations is still rather extensive.

SUMMARY OF THE INVENTION

It is therefore an object of the invention to create a method for the azimuth scaling of SAR data, and a highly accurate processor for the two-dimensional processing of ScanSAR data, that render unnecessary an interpolation for the correction of the target range variations, as well as geometric scaling in the azimuth. This aim is attained in a method for azimuth scaling of SAR data without interpolation, and in a highly accurate processor for two-dimensional processing of ScanSAR data.

In the two-dimensional processing of ScanSAR data according to the invention, the chirp scaling and SPECAN methods are used, whereby the chirp scaling method is used for range compression and correction of the target range variation, whereas a significantly improved SPECAN method according to the invention is used for the azimuth processing. Furthermore, the resampling that is required under the SPECAN method, and requires considerable computation time, is no longer needed because of the newly developed azimuth scaling according to the invention.

In the method according to the invention, a processing of sub-apertures is thus performed by combining the chirp scaling method (a range scaling technique) and the SPECAN method. Since the azimuth compression in the SPECAN method has been significantly improved through a newly developed azimuth scaling according to the invention, certain disadvantages of the SPECAN method have thus been eliminated. Specifically, the azimuth scaling according to the invention results in an elimination of the range-dependent hyperbolic azimuth phase and insertion of a linear frequency modulation for a reference range.

The method according to the invention has the following advantages over the methods used and applied in the past: because of the application of the chirp scaling method, an interpolation is no longer required to correct the target range variation. Furthermore, the correction of the target range variation is also highly accurate for large drift angles.

The process ends in the Range-Doppler domain. After the azimuth scaling, the Doppler rate corresponds in all ranges to that of the scaling range. Since this Doppler rate is thus no longer range-dependent, at the end of the processing, the azimuth scaling is automatically the same for all ranges. The desired scaling of the time-domain in azimuth direction is adjustable by selecting the scaling range during azimuth scaling. The resampling in azimuth direction required under the SPECAN method can thus be eliminated.

According to the invention, the deramping function is very well matched for all Doppler frequencies since the exact hyperbolic phase shape in the azimuth is taken into account during the azimuth scaling. The method according to the invention therefore has a very high phase accuracy.

Furthermore, only a slight expansion of the azimuth dimension is necessary to prevent aliasing during azimuth compression with the deramping function and subsequent FFT. The amount of required computations is thus kept to a minimum. Because of the Fast Fourier Transforms (FFT's) to be performed, only a minor expansion of the azimuth dimension is required, to the next power of two. A minor expansion is also required because of the azimuth scaling method. However, the expansion to the next power of two is generally sufficient.

BRIEF DESCRIPTION OF THE DRAWING FIGURES

The above and other objects and the nature and advantages of the present invention will become more apparent from the following detailed description of preferred versions of the method taken in conjunction with drawings, wherein:

FIG. 3 is a schematic view of a sample application of the method according to the invention, in the form of a block diagram;

DETAILED DESCRIPTION OF THE PREFERRED EMBODIMENTS

Figure 1:
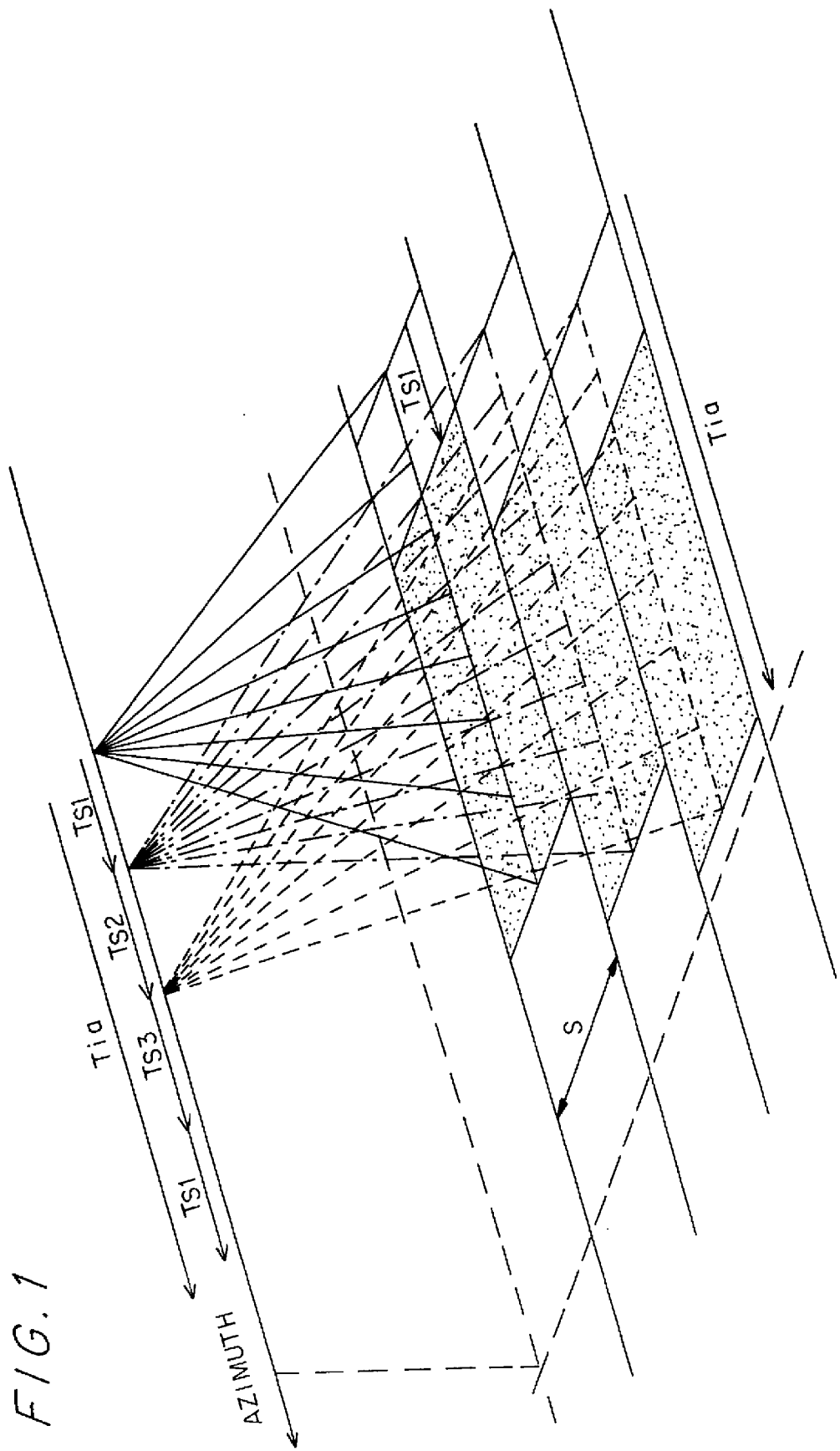
FIG. 1 is a perspective view showing the basic geometry of a SAR system in ScanSAR mode.

FIG. 1, as mentioned above, shows the basic geometry of a SAR system in ScanSAR mode. The direction of travel of a vehicle, such as an aircraft, etc., is marked azimuth. The total synthetic aperture $T_{ia}$ is divided into three sub-apertures $T_{S1}$, $T_{S2}$ and $T_{S3}$. The width of a first partial swath is marked with the letter S. The antenna views, indicated by different types of lines, each illuminate a partial swath from different look angles.

Figure 2:
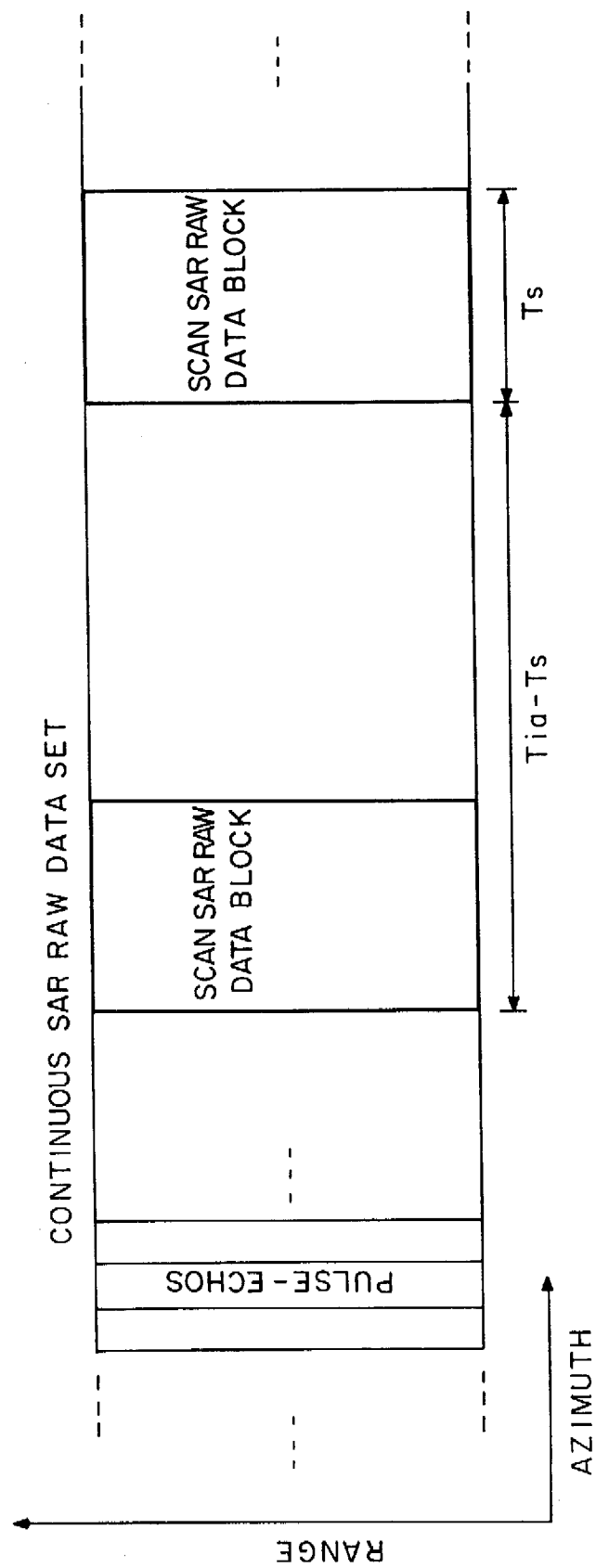
FIG. 2 is a graphical view of raw ScanSAR data as a segment of raw SAR data.

FIG. 2 shows raw ScanSAR data as a segment of raw SAR data. Raw SAR data are comprised of a presented set of echoes continuously expanded in the azimuth direction. The raw ScanSAR data, on the other hand, are blocks of echoes of the azimuth duration, which is equal to the sub-aperture time $T_S$. The period of occurrence of the raw ScanSAR data blocks in FIG. 2 was selected as the duration of the complete synthetic aperture $T_{ia}$ minus the duration of the sub-aperture $T_s$. This corresponds to an exactly gap-free imaging of a partial swath.

FIG. 3 shows a sample application of the method according to the invention, in the form of a block diagram. In the equations relating to FIG. 3, $t_a$ marks the time in the azimuth direction (i.e. the travel time), $t_e$ marks the time in range direction (i.e, the echo delay time), $f_a$ marks the azimuth frequency (i.e, the Doppler frequency), $f_e$ marks the range frequency, and $r_o$ marks the range to a point target.

In FIG. 3, raw ScanSAR data received first are multiplied in the time-domain in azimuth with a weighting function $H_0$ (Block 3.1) in a first multiplication unit 3.2, resulting in a sidelobe suppression in azimuth direction. The applied weighting function $H_0$ may be a Hamming window, for example. This weighting is performed at the beginning of the processing since after the azimuth scaling, signals from point targets in different ranges have different azimuth expansions, both in the time-domain, as well as in the frequency-domain. This means that after the azimuth scaling, the sidelobe suppression in the azimuth cannot be performed through weighting of the deramping function with the same weighting function for all ranges.

The next step (Block 3.3) is a transformation to the Range-Doppler domain through an azimuth FFT. Afterwards, a chirp scaling is performed, for which the chirp scaling function $H_1$ (Block 3.4) is multiplied onto the signal in a second multiplication unit 3.5.

The chirp scaling results in an adaptation of the range-dependent curvatures of the trajectories to the curvature of a reference trajectory for a reference range $r_{ref}$, with one trajectory representing the geometric location of the phase centers of all range signals belonging to one point target. The shape of the reference trajectory may be described with $t_{e,ref}(f_a)$ in the following manner:

$$t_{e,ref}(f_a) = \frac{2r_{ref}}{c_o} (a(f_a) + 1) \quad (1)$$

where the linear scaling factor a ($f_a$) describes the frequency-dependence of the range variation. In (1), $c_0$ denotes the speed of light.

$$a(f_a) = \frac{1}{\sqrt{1 - \frac{\lambda^2 f_a^2}{4V_g V_s}}} - 1 \quad (2)$$

In (2), $\lambda$ denotes the wavelength, $V_g$ denotes the velocity on the ground, and $V_s$ denotes the velocity of the vehicle.

In the chirp scaling function $H_1$, $k_{eff}$ is the modulation rate in the range direction, whereby this modulation rate is dependent on the azimuth frequency and the reference range, and also takes the secondary range compression into account:

$$H_1(f_a, t_e; r_o) = exp[-j\pi k_{eff}(f_a; r_{ref}) a(f_a)(t_e - t_{e,ref}(f_a))^2] \quad (3)$$

After the chirp scaling, a range FFT (Block 3.6) is used for the transformation to the two-dimensional frequency-domain where the range compression and the correction of the target range variation are performed through multiplication with the phase function $H_2$ (Block 3.7) in a third multiplication unit 3.8:

$$H_2(f_a, f_e; r_{ref}) = exp\left[\frac{-j\pi f_e^2}{k_{eff}(f_a; r_{ref})(1 + a(f_a))}\right] exp\left[\frac{j4\pi}{c_o} r_{ref} a(f_a) f_e\right] \quad (4)$$

In (4), the first exponential expression denotes the filter function for the range compression. The second exponential expression produces a correction of the target range variation. Because of the performed chirp scaling, this correction can be performed for all ranges at the same time with a linear shifting in range direction that is only dependent on the azimuth frequency.

In the next step of the process, an IFFT (Inverse Fast Fourier Transform; Block 3.9) is used for a transformation back to the Range-Doppler domain. During the chirp scaling, an additional, range-dependent azimuth phase results, which is removed through multiplication with a correction function $H_3$ (block 3.10) in a fourth multiplication unit 3.11.

$$H_3(f_a; r_o) = exp\left[j\pi k_{eff}(f_a; r_{ref})(1 + a(f_a)) a(f_a) \left(\frac{2}{c_o}(r_o - r_{ref})\right)^2\right] \quad (5)$$

The next processing step is again performed in the Range-Doppler domain. A compensation of the antenna diagram in azimuth is achieved through multiplication with a weighting function $H_4$ ($f_a$) (Block 3.12) in a fifth multiplication unit 3.13. The antenna diagram may be calculated, based on theoretical models, or determined through measurements prior to the actual application. The weighting function $H_4$ ($f_a$) is the reciprocal value of the determined antenna diagram.

In the next step of the process, an azimuth scaling is performed. This results in the removal of the hyperbolic azimuth phase and replacement of the same with an exactly quadratic phase shape through multiplication of the signals with a phase function $H_5$ (Block 3.14) in a sixth multiplication unit 3.15. Because of the exactly linear frequency modulation still remaining after the azimuth scaling, a deramping is later performed that is very well matched for all points in time. The accuracy of the azimuth compression of the chirp scaling method is transferred to the fast SPE-CAN method with the phase function $H_5$.

$$H_5(f_a; r_o) = exp\left[\frac{j4\pi r_o}{\lambda}\left(\sqrt{1 - \frac{f_a^2 \lambda^2}{4V_g V_s}} - 1\right)\right] exp\left[\frac{j\pi}{k_{scl}} f_a^2\right] \quad (6)$$

where $$k_{scl} = \frac{2V_g V_s}{\lambda r_{scl}} \quad (7)$$

In the above equation, $r_{scl}$ is the scaling range that determines the scaling Doppler rate $k_{scl}$ applicable to all ranges.

Since the azimuth scaling in the time-domain results in a displacement of azimuth signals that are not located in the illumination center, a slight expansion of the azimuth dimension (by approximately 20%) is required. However, this expansion usually falls within the range attained by the expansion to the next power of two. The number of azimuth points should be a power of two, to keep the computation time for the azimuth FFT's short.

In the next step of the process, an azimuth IFFT (Block 3.16) is used for a transformation back to the time-domain. Because of the deramping (Block 3.17) performed at this stage, the linear frequency modulation is performed through multiplication with the deramping function $H_6$ (Block 3.17), in a seventh multiplication unit 3.18. The deramping function is a linear frequency-modulated signal with the inverted scaling Doppler rate of the azimuth scaling.

$$H_6(t_a) = \exp[j\pi k^{scl} t_a^2] \quad (8)$$

After multiplication with the deramping function, the azimuth signal in the time-domain is an overlay of continuous oscillations that are separated and compressed into pulses through an azimuth FFT (Block 3.19) in the next step of the process. During the last step of the process, a phase correction is performed to compensate for a phase error caused by centering the azimuth signals in the raw data. For this correction, the phase function $H_7$ ($f_a$) (Block 3.20) is multiplied onto the signals in the last processing step, in an eighth multiplication unit 3.21.

$$H_7(f_a) = \exp\left[j2\pi f_a \frac{T}{2}\right] \quad (9)$$

In the above equation, T' denotes the overall duration of the azimuth dimension in the time-domain after expansion of the azimuth dimension.

FIGS. 4A–4E show several intermediate processing steps for clarification and illustration of the block diagram in FIG. 3. Picture 4.1 of FIG. 4A, marked "raw data block", shows the azimuth signals contained in a raw data block for three point signals in the time-domain. The travel time $t_a$ in azimuth direction has been entered on the abscissa, and the echo delay time $t_e$ has been entered in range direction on the ordinate. A target marked with the letter B is located in the center, and targets A and C are located at the right and left edges of the valid partial swath. The duration $T_{ia}$–$T_s$ of the valid partial swath is the maximum duration that can be processed from a raw data block of the duration $T_s$. From the signal patterns it is apparent that the azimuth signals of the three point signals A through C represent different segments of a complete azimuth chirp as it is present during normal SAR processing.

The first step of the process, the sidelobe suppression in the azimuth, is not shown in detail in FIG. 4. After the transformation to the Range-Doppler domain with the azimuth FFT (Block 4.2 in FIG. 4A and Block 3.3. in FIG. 3), the azimuth spectrum of three partial chirps is presented in picture 4.3 (FIG. 4B). The azimuth or Doppler frequency $f_a$ has been entered on the abscissa and the echo delay time $t_e$ in range direction has again been entered on the ordinate. The azimuth signals that are overlapped in the time-domain, are located at different Doppler frequencies in the Range-Doppler domain, depending on the azimuth position of the targets under the given illumination.

After correction of the target range variation (Block 4.4 in FIG. 4B, and upper portion of Block 3.7 in FIG. 3) and range compression, including secondary range compression (Block 4.5 in FIG. 4B, and lower portion of Block 3.7 in FIG. 3) in the two-dimensional frequency-domain, the azimuth signals of the point targets are again shown in the Range-Doppler domain in picture 4.6, with the azimuth and Doppler frequency $f_a$ again entered on the abscissa and the amplitude entered on the ordinate. In picture 4.8 (FIG. 4D), the signals are shown after the compensation of the antenna diagram in the azimuth (Block 4.7 in FIG. 4C, and Block 3.12 in FIG. 4).

Figure 4A:
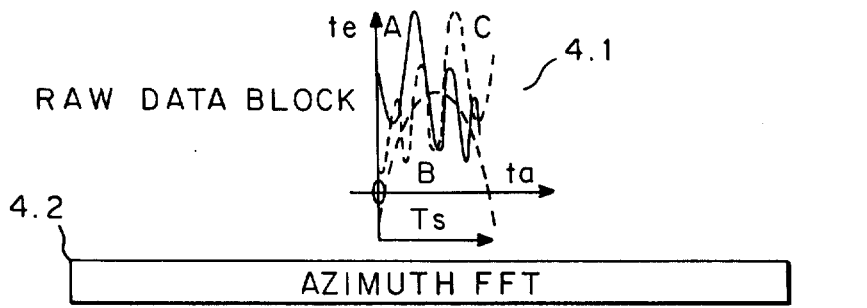
FIGS. 4A–4E are graphical/schematic views of several intermediate processing steps according to the sample application of the method as shown in FIG. 3.
Figure 4B:
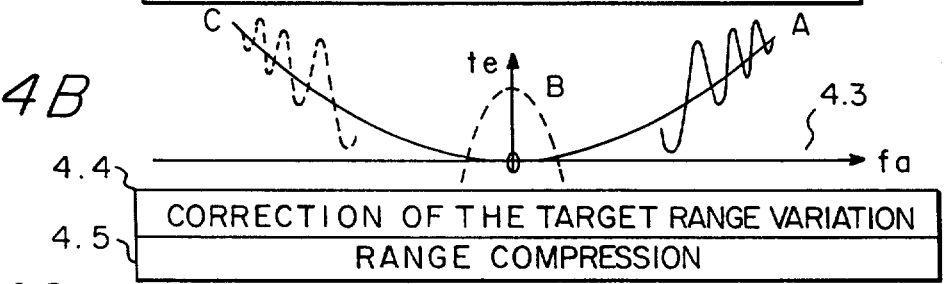
Figure 4C:
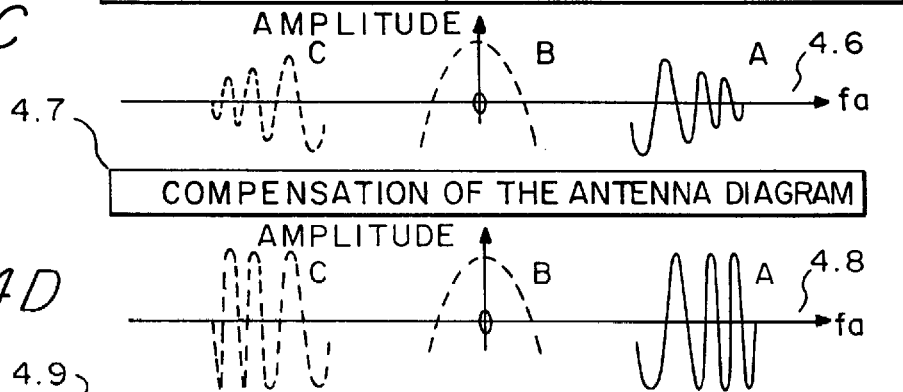
Figure 4D:
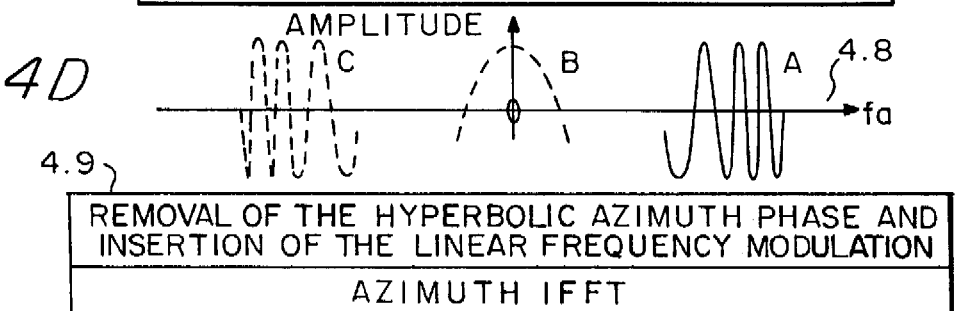
Figure 4E:
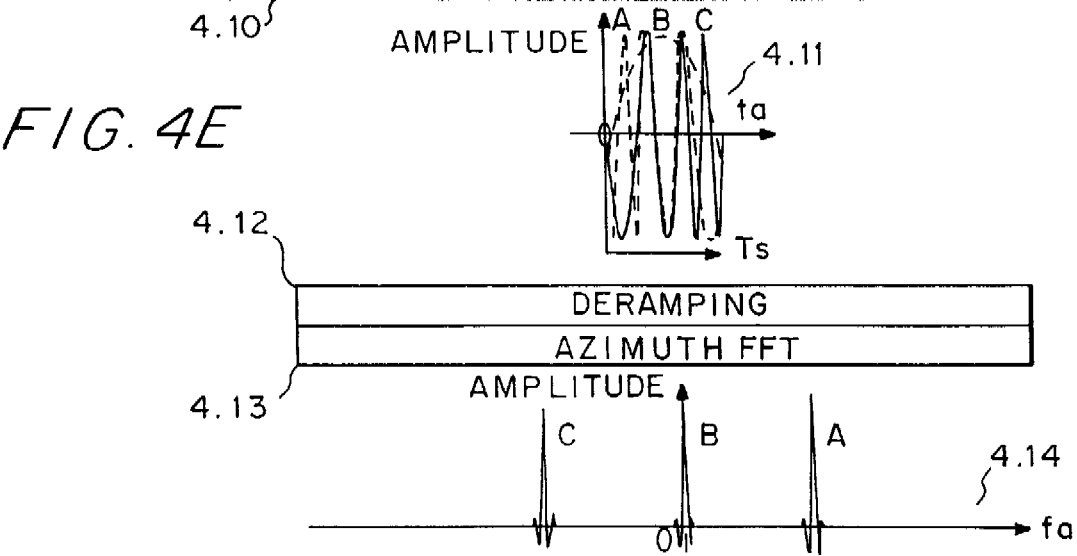

In picture 4.11, the signals are shown after an azimuth scaling, during which the hyperbolic azimuth phase was removed and the linear frequency modulation inserted (see Block 4.9 in FIG. 4D, and Block 3.14 in FIG. 3), and after transformation back to the time-domain with the azimuth IFFT (Block 4.10 in FIG. 4D, and Block 3.16 in FIG. 3). The shown signals stem from targets at the scaling range $r_{scl}$. Therefore, no azimuth time displacement exists and the signals are located exactly above one another, as shown in picture 4.11.

After a deramping (Block 4.12 in FIG. 4E, and Block 3.17 in FIG. 3) and the azimuth FFT (Block 4.13 in FIG. 4E, and Block 3.19 in FIG. 3), the final processed signals are shown in the last picture 4.14. The last processing step, i.e. the phase correction based on the time shifting of the raw data (Block 3.20 in FIG. 3), is not shown separately in FIGS. 4A–4E.

Figure 5:
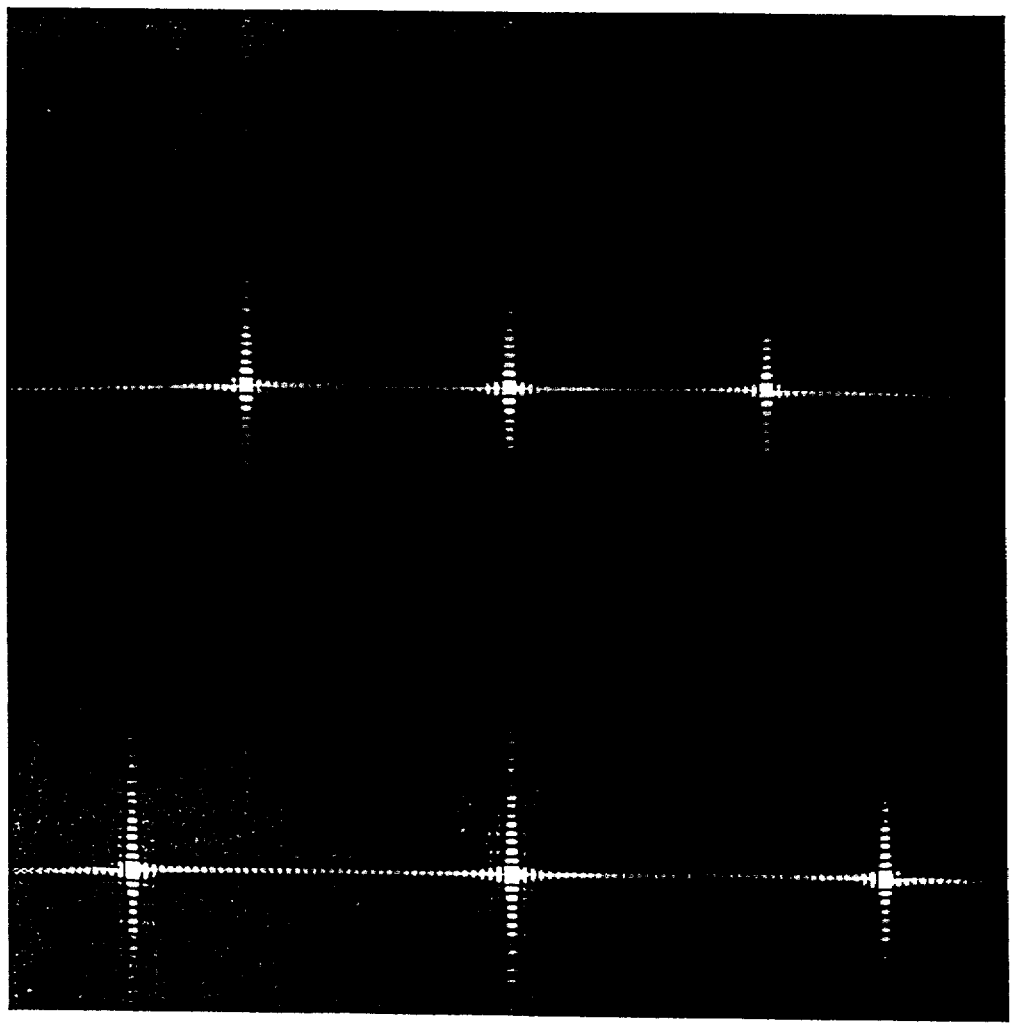
FIG. 5 shows the result of the processing of six point targets with the aid of the method according to the invention, without azimuth scaling.

FIG. 5 shows the result of a processing of six point targets with the aid of the method according to the invention, without azimuth scaling. The targets are thus located in two different ranges, so that two point targets are always collocated in the same azimuth position. The azimuth scaling with different ranges is apparent from the different azimuth positions of the targets. Attaining a scaling that is constant with the range requires a complex resampling after the processing.

Figure 6:
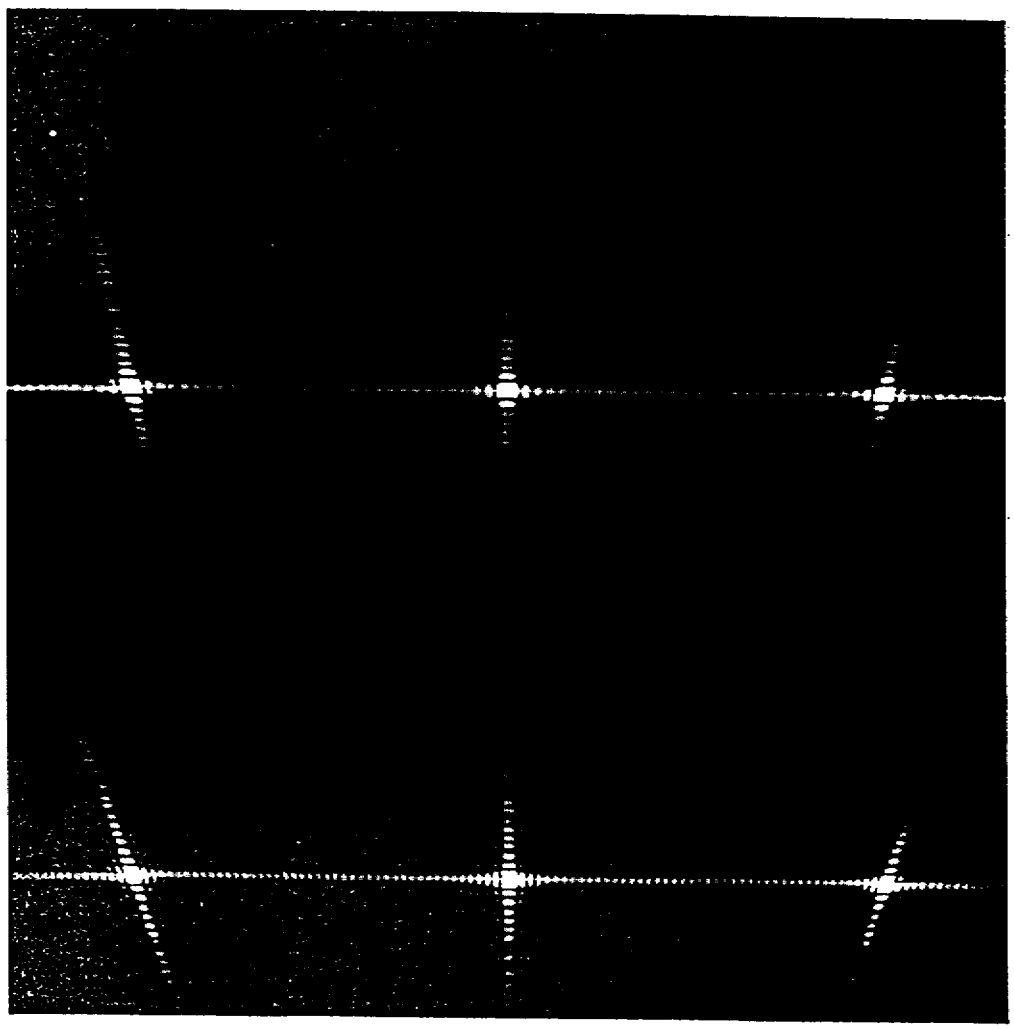
FIG. 6 shows a result of the processing with the aid of the method according to the invention with azimuth scaling.

FIG. 6 therefore shows the result of the processing based on the method according to the invention with an azimuth scaling. Since the azimuth scaling is already accurate after the last azimuth FFT (Blocks 3.19 and 4.13), a resampling has become unnecessary according to the invention.

Figure 7:
FIG. 7 is a plan view of a real scene processed from portions of raw data from an experimental SAR System (E-SAR) of the applicant's.

FIG. 7 shows a real scene processed from raw data of the experimental SAR system (E-SAR) owned by the assignee of the present invention, the German Aerospace Research Center (DLR). In the processing, the ScanSAR mode was simulated by using only sections of the continuous set of raw data in the azimuth. The duration of the sub-aperture $T_s$ was set to one quarter (¼) of the available synthetic aperture $T_{ia}$. To suppress the speckle noise, a sliding averaging was performed both in azimuth and range direction.

The shown scene has a size (azimuth×range) of (4056 m×3072 m) with an azimuth resolution in the close range of approximately 19.5 m and in the far range of approximately 21 m. The range resolution is approximately 13.5 m.

In the right half of the presented scene is a railway track with a noticeable continuous variation between bright and dark sections. This is a result of the processing in azimuth direction from different portions of the antenna diagram. The railway track deflects very differently under different look angles of the antenna.

The azimuth scaling performed according to the invention may also be used for data processing of SAR data in the spotlight mode. This allows for processing without interpolation, like the processing of ScanSAR data.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. The means and materials for carrying out various disclosed functions may take a variety of alternative forms without departing from the invention. It is to be understood that the phraseology or terminology employed herein is for the purpose of description and not of limitation.

What is claimed is:

1. A method for azimuth scaling of raw SAR data without interpolation, comprising the steps of:

multiplying the raw SAR data by a phase function $H_5$ given by a first equation $$H_5(f_a;r_o) = \exp\left[\frac{j4\pi r_o}{\lambda}\left(\sqrt{1-\frac{f_a^2\lambda^2}{4V_gV_s}}-1\right)\right]\exp\left[\frac{j\pi}{k_{scl}}f_a^2\right] \quad (6)$$

where $$k_{scl} = \frac{2V_gV_s}{\lambda r_{scl}} \quad (7)$$

and where $f_a$ is an azimuth frequency, $r_o$ is a range to a target point, M is a wavelength, $V_g$ is a ground velocity, $V_s$ is a vehicle velocity, $k_{scl}$ is a scaling Doppler rate, and $r_{scl}$ is a scaling range, whereby the scaling range $r_{scl}$ is within a range dimension of an image;

whereby azimuth modulation of the SAR data is made independent of the range $r_o$ and is adapted to the scaling range $r_{scl}$; and whereby azimuth frequency modulation becomes exactly linear and a quadratic phase modulation is performed instead of a hyperbolic phase modulation in the azimuth.

2. The method according to claim 1, including two-dimensional processing of ScanSAR data by a chirp scaling method and a SPECAN method, comprising:

(a) before performing the step of azimuth scaling, sequentially performing the steps of:

multiplying raw ScanSAR data for sidelobe suppression in a time-domain in the azimuth direction by a weighting function $H_0$ (3.2);

performing a first azimuth FFT (3.3) to obtain first signals;

multiplying the first signals by a chirp scaling function $H_1$ (3.5) given by a second equation $$H_1(f_a,t_e;r_o) = \exp[-j\pi k_{eff}(f_a;r_{ref})a(f_a)(t_e - t_{e,ref}(f_a))^2] \quad (3)$$

performing a range FFT (3.6) to obtain second signals in the two-dimensional frequency-domain;

subjecting the second signals to a range compression and correction of a target range variation through multiplication (3.8) with a phase function $H_2$ given by a third equation $$H_2(f_a,f_e;r_{ref}) = \exp\left[\frac{-j\pi f_e^2}{k_{eff}(f_a;r_{ref})(1+a(f_a))}\right]\exp\left[\frac{j4\pi}{c_o}r_{ref}a(f_a)f_e\right] \quad (4)$$

to obtain third signals;

performing a range IFFT (.3.9) on the third signals, multiplying the third signals by a phase correction function $H_3$ (3.11) given by a fourth equation $$H_3(f_a;r_o) = \exp\left[j\pi k_{eff}(f_a;r_{ref})(1+a(f_a))a(f_a)\left(\frac{2}{c_o}(r_o-r_{ref})\right)^2\right], \quad (5)$$

and subsequently multiplying (3.13) the third signals by a weighting function $H_4$ ($f_a$) corresponding to a reciprocal value of a determined antenna diagram; and after performing the step of azimuth scaling, sequentially performing the steps of:

transforming back to a time domain with an azimuth IFFT (3.16) to obtain time data;

multiplying the time data obtained by a deramping function $$H_6(t_a) = \exp[j\pi k^{scl}t_a^2] \quad (8)$$

performing a second azimuth FFT (3.19) to obtain fourth signals; and multiplying the fourth signals by a phase function $H_7$ given by a fifth equation $$H_7(f_a) = \exp\left[j2\pi f_a\frac{T}{2}\right] \quad (9)$$

where $f_a$ is an azimuth frequency, $t_e$ is a time in range direction, $r_o$ is a range to a point in time, $k_{eff}$ is a modulation rate depending on the azimuth frequency and a reference range $r_{ref}$, a ($f_a$) is a linear scaling factor, $f_e$ is a range frequency, $c_o$ is the speed of light, $\lambda$ is a wavelength, $V_g$ is the ground velocity, $V_s$ is the ground velocity, $k_{scl}$ is a scaling Doppler rate, $r_{scl}$ is a scaling range, $t_a$ is a time in azimuth direction, and T' is a total duration of the azimuth signal in the time-domain.

* * * * *